(12) United States Patent
Pham

(10) Patent No.: US 9,060,641 B1
(45) Date of Patent: Jun. 23, 2015

(54) GRILL GRATE WITH REMOVABLE BARS

(71) Applicant: Hao Kim Pham, Arlington, TX (US)

(72) Inventor: Hao Kim Pham, Arlington, TX (US)

( * ) Notice: Subject to any disclaimer, the term of this patent is extended or adjusted under 35 U.S.C. 154(b) by 0 days.

(21) Appl. No.: 14/243,756

(22) Filed: Apr. 2, 2014

(51) Int. Cl.
*A47J 37/07* (2006.01)
*A47J 37/06* (2006.01)
*A23L 1/01* (2006.01)

(52) U.S. Cl.
CPC ............. *A47J 37/0694* (2013.01); *A23L 1/01* (2013.01)

(58) Field of Classification Search
CPC .................................. A47J 37/00; F24C 3/14
USPC ............... 126/25 R, 30, 29; 99/450; 426/523; 134/25.3, 25.2
See application file for complete search history.

(56) References Cited

U.S. PATENT DOCUMENTS

| | | |
|---|---|---|
| 1,111,870 A | 9/1914 | Spurgeon |
| 1,642,604 A | 9/1927 | Cox |
| 2,012,811 A | 8/1935 | Duffy |
| 2,091,488 A | 8/1937 | Polhemus |
| 2,213,483 A | 9/1940 | Benson |
| 2,253,434 A | 8/1941 | Kernick |
| 2,485,890 A | 10/1949 | Keljik |
| 2,543,297 A | 2/1951 | Olmsjed |
| 2,573,115 A | 10/1951 | Sisto |
| 2,740,395 A | 4/1956 | Goodwin |
| 2,790,434 A | 4/1957 | Delfrancia |
| 2,856,502 A | 10/1958 | Woff |
| 3,082,757 A | 3/1963 | Hohe |
| 3,101,080 A | 8/1963 | Lorbacher |
| 3,404,671 A * | 10/1968 | Wasserman ................. 126/25 R |
| 3,424,145 A * | 1/1969 | Stitt ............................ 126/25 R |
| 3,555,994 A | 1/1971 | Nemetz |
| 4,688,543 A | 8/1987 | Kopke |
| 4,987,880 A * | 1/1991 | Zabala ........................ 126/25 R |
| 5,172,628 A * | 12/1992 | Pillsbury et al. ............ 99/421 H |
| 5,715,744 A * | 2/1998 | Coutant ...................... 99/421 H |
| 7,164,850 B1 * | 1/2007 | Ho ................................. 392/407 |
| 7,810,487 B2 * | 10/2010 | Johnston ....................... 126/168 |
| 8,047,196 B1 * | 11/2011 | Schacht .......................... 126/29 |
| 2008/0047540 A1 * | 2/2008 | Hoffman et al. ............ 126/25 A |
| 2008/0066626 A1 * | 3/2008 | Raichlen et al. ............ 99/421 H |
| 2009/0064872 A1 * | 3/2009 | Zisserson ....................... 99/450 |
| 2011/0132205 A1 * | 6/2011 | Brown ............................ 99/450 |
| 2013/0081607 A1 * | 4/2013 | Weyandt ......................... 126/29 |

OTHER PUBLICATIONS http://www.bing.com/images/search?q--Shish-kabob+rack&qpvt--Shish-kabob+rack&FORM--IGRE.

* cited by examiner

*Primary Examiner* — Nina Bhat

(57) ABSTRACT

Provided is a grill grate with removable bars for improving cleaning performance on a cooking grill. The grill grate with removable bars has a frame structure, configured to be placed over a heat source in the grill, where the frame structure has a plurality of notches. The grill grate further includes a plurality of grill bars, configured to support food during cooking and positioned on the frame structure. Also provided are methods of providing an improved grill grate for cleaning grill including the steps of: forming a frame structure, configured to be positioned above a heat source on the cooking grill; forming a plurality of grill bars, configured to receive food to be cooked thereon.

4 Claims, 1 Drawing Sheet

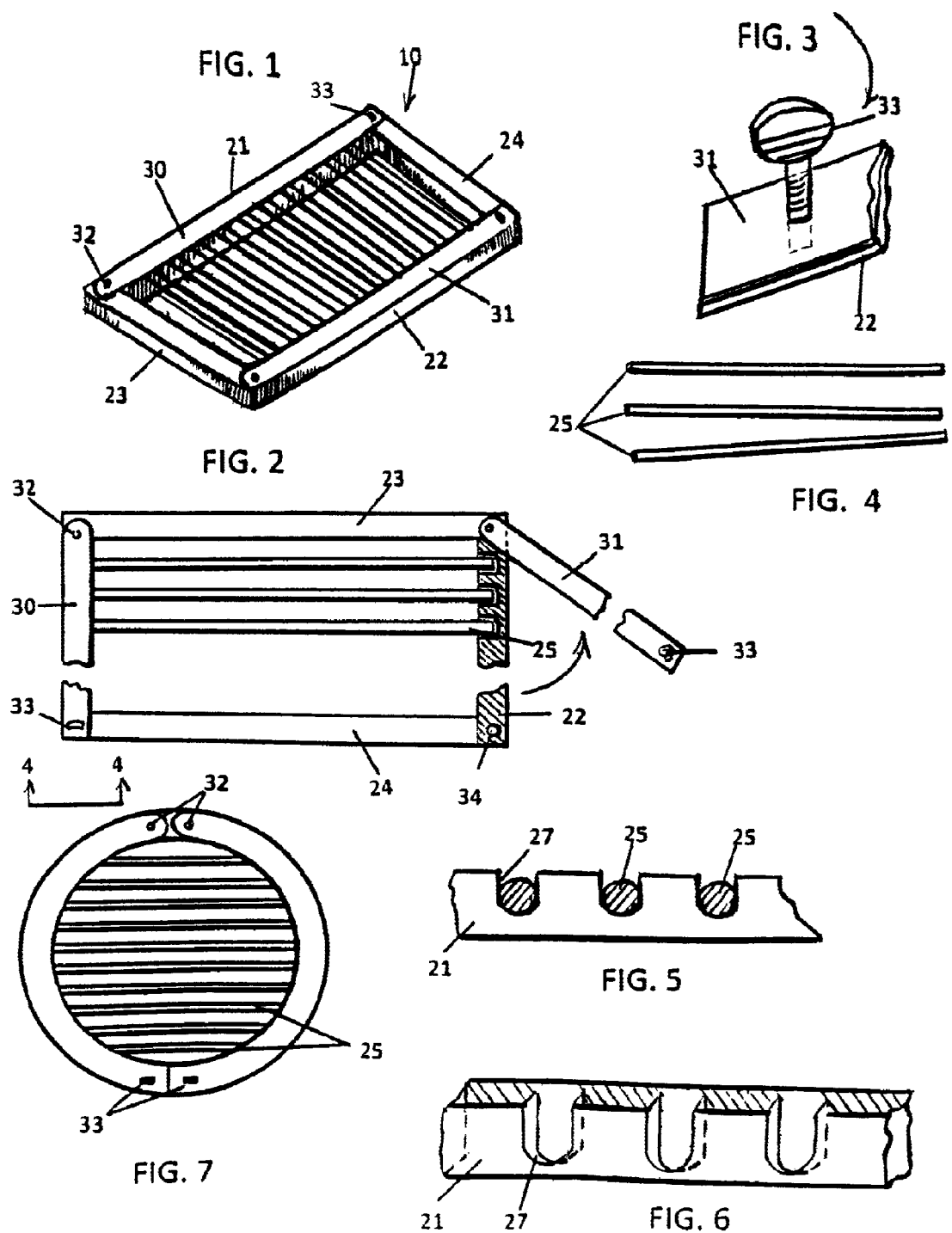

GRILL GRATE WITH REMOVABLE BARS

RELATED APPLICATIONS

This application claims priority from U.S. Provisional Patent Application No. 61/877,615, filed on Sep. 13, 2013, titled, "Grill Grate With Removable Rods" the content of which is incorporated herein by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

This application relates generally to cooking grill and in particular to a grill grate having removable bars for improving cleaning performance for a cooking grill.

BACKGROUND OF THE INVENTION

The grill grate before having grate bars were attached to frame and connected each other by spot welding permanently. The grill grates by their very natures are so complex, structurally, that cleaning of the grills amounts to a major effort, troublesome in the extreme. It is impossible to clean grease, oil, fat and other liquids have accumulated on the grill grate bars.

In order to facilitate cleaning of the grill, removable grill bars are disclosed in U.S. Pat. No. 3,101,080, issued to A. G. Lorbacher on Aug. 20, 1963. However, the bars must still be cleaned, and while it is somewhat easier to do with the bars removed, it is still an unpleasant chore. The Lorbacher patent, while a step forward, does not completely solve the problem.

In the U.S. Pat. No. 3,082,757 was granted to D. G. Hohe on Mar. 26, 1963, represented another approach to the cleaning on the grill grate. It will be appreciated, however, that the disposable cover is applicable to only one size and shape grill. In addition, the U.S. Pat. No. 3,404,671, issued to Seymour Wasseman on Oct. 8, 1968 and the U.S. Pat. No. 4,987,880, issued to Zabala on Jan. 29, 1991, both represented another way to eliminate the cleaning step by tubular grate bar covers but they also applicable to only one size and shape grill, and they tend to be either expensive to manufacture and clumsy to use.

ADVANTAGES

The grill grate with removable bars completely solves the aforementioned problems:
  By saving time: Easy to remove grill bars helps make the cleaning process much easier and reduces the time it takes to clean the grill.
  By saving money: a user will no longer need to buy the brushes, scrapes, or chemical products used to clean grill. After cooking, the users can put the grill bars in dish washer and let the washing machine do the job for them. Additionally, the grill grate with removable bars can be produced in all standard sizes to fit most grills. If the users have a grill, they don't need to buy a new one, they still can use their grill and simply replace their old, used grill grate with the brand new grill grate with removable bars.
  The grill grate with removable bars promotes healthier BBQ! No more greasy, black, bitter tasting (burned and residue) harmful stripes on food.

Further, if the users use aluminum foil to cover the removable grill bars before cooking, they can completely eliminate time consuming grill cleaning!

SUMMARY OF THE INVENTION

Briefly described, one embodiment, among others, can be implemented as a cooking grate for improving cleaning performance on a cooking grill, comprising: a frame structure having at least two opposed sides which configured to be placed over a heat source in the cooking grill, on top of the two opposed sides frame structure includes a series of bar supports that attach to the frame structure and form notches or supports or seats for the bars, and a plurality of cooking bars configured to support food during cooking and positioned on the frame structure.

The grill bars are functionally and structurally serve as the cooking surface which can be fasted or attached by any type of fastening means and can be configured to attach to the notches.

The grill bars have a length dimension corresponding to a width of the cooking grate, configured both ends of each bar resting in notches formed in the frame structure.

The notches are formed by stamping on frame structure which serve as a seats for the bars. The notches have housing configuration with two sidewalls, a bottom and a back side are closed but a top and a front side are opened. The notches are configured to prevent longitudinal movement of the removable bars.

The notches and the grill bars are removably attachable and can be easily cleaned.

On to of two opposed sides of the frame structure include a pair of cover bars configured to hold the ends of the removable bars for preventing vertical movement of the bars.

The present disclosure, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is a perspective view of a grill grate with removable bars in accordance with this invention, which is suitable for installing or removing the grate bars from the frame;

FIG. 2 is a partial top plan view of the grill grate showing the cover bar positions for securing or releasing the free end of the bars;

FIG. 3 is an enlarged side—elevation view of the gill grate taken along line 4-4 of FIG. 2;

FIG. 4 showing a plan view of removable bars individually;

FIG. 5 is end elevation and perspective views, showing the free end of grill bars in the frame's notches without cover bar;

FIG. 6 is a perspective view of a portion of the long site grill frame illustrating the grate frame's notches;

FIG. 7 is a plan view of other preferred embodiment of a grill grate with removable bars, in accordance with this invention.

DESCRIPTION OF THE PREFERRED EMBODIMENTS

Having summarized various aspects of the present disclosure, reference will now be made in detail to the description of the disclosure as illustrated in the drawings. References now made to FIG. 1, which is a perspective view of a grill grate with removable bars as utilized in an embodiment as disclosed herein. The grill grate 10 includes a frame structure having at least two opposed sides 21, 22 and two other sides 23, 24. The grill grate 10 also includes a plurality of bars 25 for supporting food during cooking. On top of the grate structure 21, 22 include elements which are referred to as notches 27. The bars 25 can be fasted or attached by any type of fastening means and can be configured to attach to the notches. The notches and the grill bars are removably attachable and can be easily cleaned.

Each of grill bars being attached to frame at its first and second end by notches, therefore each of grill bars can be easily installed or removed therefrom, see FIG. 2. For securing the free ends of the bars, the top opening of side 21 is closed by a cover bar 30, which having its ends pivotally mounted by a hinge pin 32 at the respective ends of frame structure 21. The cover bars in first position configures to hold the end of removable bars for preventing vertical movement of the bars.

In FIG. 3, the thumb crew or suitable latch means 33 on the cover bars 30,31 that engage a hole or fixed pin 34 on the top of the grill grate frame also is included so that the cover bars may not be accidentally opened. The thumb screw or suitable latch means that attached on the top of the frame structure, configured to support the grill grate having standard size for fitting almost grills.

The grill bars are secured to grate frame by notches therefore the grill bars are free for installing of and removal of from grill grate see FIG. 4. Each of grill bars 25 can be constructed out of a solid elongated heat resistant material including, but not limited to, metallic or ceramic bar, rod, or wire. Further, the grill bars can also be elongated sheet formed into a profile including, but not limited to U-shape, V-shape, or C-shape. Similarly, although the grill bars are illustrated as substantially parallel, other grill bars arrangements are consistent within the scope and spirit of this disclosure.

Notches 27 adapted to be formed U-shaped or semicircular or any other convenient configuration. The notches 27 attach to the frame by stamping on frame structure. The notches can be configured a housing with a pair of opposing sidewalls, a bottom, and a back side are closed but a top and a front side are opened. The notches are configured to prevent longitudinal movement of the removable bars. see FIGS. 5 & 6.

The method for using the grill grate with removable bars includes providing a frame structure for support and alignment of the grill bars. The frame structure is generally configured to receive the grill bars in a substantially perpendicular arrangement. The grill grate is assembled by attaching the grill bars to the frame structure such that the grill bars are arranged to create a substantially planar cooking surface.

Another preferred embodiment of the grill grate with removable bars is generally indicated in FIG. 7 may be used in this disclosure although they have the different length bars. Further, the above descriptions and drawings illustrate a generally rectangular geometry, one of ordinary skill in the art will appreciate that the scope and spirit of this disclosure is not limited to a specific geometry. The grill grate with removable bars herein is directly applicable to grates and grills having circular, elliptical, or a variety of polygonal geometries.

This application has been described in its presently contemplated best modes, and it is clear that it is susceptible to numerous modifications, modes and embodiments within the ability of those skilled in the art and without the exercise of the inventive faculty. Accordingly, the scope of this application is defined by the scope of the following claims.

I claim:

1. A grill grate with removable bars comprising: (a) a frame structure having at least two opposed sides, configured to be placed over a heat source in the grill; (b) a plurality of grill bars, configured to support food during cooking; (c) on both of opposed sides of said frame structure includes notch elements, configured to receive the ends of the bars for securing the bars to said frame; (d) and two cover bars on top of said frame structure, configured securing the bars to said frame.

2. The grill grate with removable bars of claim 1 wherein the notches are formed to a housing configuration with a pair of wall sides, a bottom and back sides are closed, but a top and a front sides are opened.

3. The grill grate with removable bars of claim 1 wherein said notches are configured to prevent longitudinal movement of said removable bars.

4. The grill grate with removable bars of claim 1 wherein the cover bars include thumb screw or latch means at the end of said cover bars for holding the ends of the removable bars preventing vertical movement of said bars.

* * * * *

UNITED STATES PATENT AND TRADEMARK OFFICE
CERTIFICATE OF CORRECTION

| | | |
|---|---|---|
| PATENT NO. | : 9,060,641 B1 | Page 1 of 1 |
| APPLICATION NO. | : 14/243756 | |
| DATED | : June 23, 2015 | |
| INVENTOR(S) | : Hao Kim Pham | |

It is certified that error appears in the above-identified patent and that said Letters Patent is hereby corrected as shown below:

In the Specification

Col. 1, line 64, delete "washing".

Col. 2, line 36, change 'On to' to --On top--

Col. 3, line 21, after "bars." insert --The cover bars in second position configures to release the free ends of the bars.--

Signed and Sealed this
Fifteenth Day of September, 2015

Michelle K. Lee
*Director of the United States Patent and Trademark Office*